UNITED STATES PATENT OFFICE.

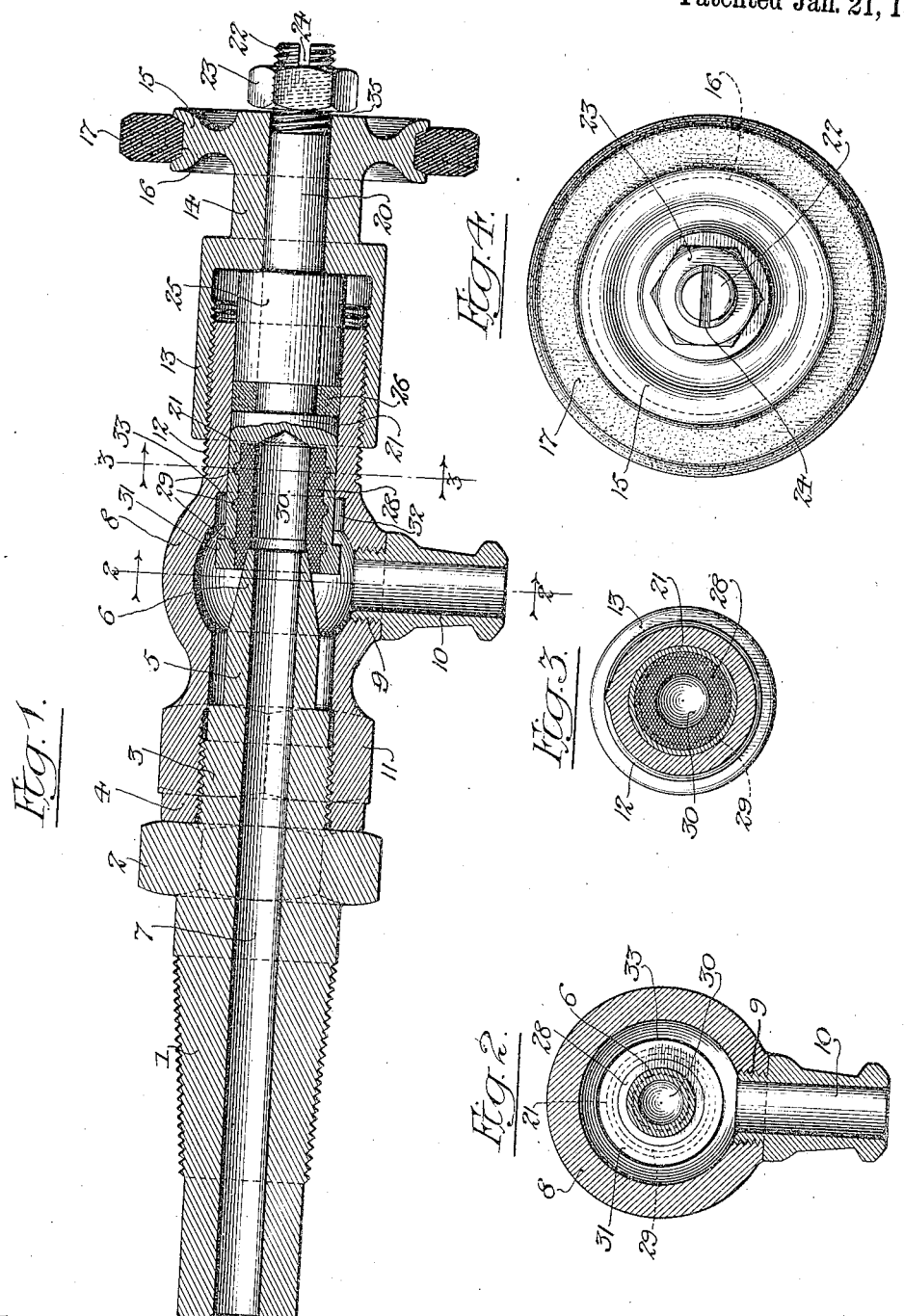

GEORGE J. HATZ, OF OMAHA, NEBRASKA, ASSIGNOR OF ONE-HALF TO CHARLES E. FULLER, OF OMAHA, NEBRASKA.

GAGE-COCK.

1,051,106.  Specification of Letters Patent.  Patented Jan. 21, 1913.

Application filed September 27, 1912. Serial No. 722,616.

*To all whom it may concern:*

Be it known that I, GEORGE J. HATZ, a citizen of the United States, residing at Omaha, in the county of Douglas, State of Nebraska, have invented certain new and useful Improvements in Gage-Cocks, of which I do declare the following to be a full, clear, and exact description, reference being had to the accompanying drawing, forming part of this specification.

My present invention, while susceptible of use in whole or in part in a variety of situations, is designed to provide a gage cock especially applicable for use upon locomotive engine boilers.

The invention consists in the various novel features of improvement hereinafter described, illustrated in the accompanying drawings and particularly pointed out in the claims at the end of this specification.

Figure 1 is a view in central longitudinal section (parts being shown in elevation) through a gage cock embodying my invention. Fig. 2 is a view in vertical cross-section on line 2—2 of Fig. 1. Fig. 3 is a view in vertical cross-section on line 3—3 of Fig. 1. Fig. 4 is an outer end view.

The plug of my improved gage cock comprises a threaded portion 1 adapted to be screwed into a correspondingly threaded opening in the boiler in the usual manner, this plug being formed with a hexagonal portion 2 to receive a suitable wrench. Adjacent the hexagonal portion 2 the plug is preferably reduced in diameter and formed with the exteriorly screw threaded portion 3 adapted to be engaged by the interiorly threaded inner end portion 4 of the chambered body of the gage cock. Integral with the plug at its outer end is formed an extension 5 having at its end a conoidal shaped valve seat 6, and extending from end to end of the plug is formed the central channel or passageway 7 for steam or water.

In the chambered spherical portion 8 of the body of the gage cock is formed a threaded opening into which fits the correspondingly threaded portion 9 of the usual nipple 10. Preferably, the conoidal valve seat 6 terminates within the spherical chambered portion of the body of the gage cock and at a point approximately opposite the nipple outlet, as with this arrangement the danger of any obstruction is materially lessened. Adjacent its inner end the body of the gage cock is formed with a hexagonal shaped outer portion 11 adapted to be engaged by a suitable wrench.

The outer portion of the body of the gage cock is exteriorly screw threaded, as at 12, and is engaged by a correspondingly interiorly threaded, chambered cap or bonnet 13 having an outwardly extending part 14 provided with a hand wheel 15. This hand wheel 15 is formed with a peripheral groove 16 within which is sprung and securely held an annular grip or handle 17 of soft or flexible rubber. This annular rubber grip or handle 17 affords an exceedingly effective means for manipulating the cock as it does not become overheated and under the hand of the operator takes a firm grip upon the periphery of the hand wheel 15.

Through the extended portion 14 of bonnet 13 passes the reduced stem 20 of a chambered valve 21 that engages the conoidal seat 6 of the cock. The outer end of the valve stem 20 is formed with a threaded portion 22 that is engaged by a threaded nut 23, and the extreme end of the valve stem 20 is provided with a slot 24, the purpose of which will presently more fully appear. The valve stem 20 is encircled by a sleeve 25, preferably of metal and between this sleeve 25 and the body portion of the valve 21 is placed a packing ring 26 of fiber, soft metal or other suitable material, this packing ring 26 encircling the inner portion of the valve stem 20. The purpose of the packing ring 26 is to form a tight joint with the inner wall of the outer cylindrical portion of the body of the cock and thus avoid danger of leakage through the outer end portion of the cock.

The chambered body of the valve 21 is preferably furnished with a lining 28 of Babbitt metal or other suitable material that can be replaced and renewed from time to time, as required, and to more effectively hold this lining 28 within the chambered portion of the valve 21, annular grooves or seats are formed around the inner surface of the chamber of the valve 21 to receive the projecting portions 29 of the lining 28. The lining 28 of the valve is formed with a chamber 30 into which steam or water will discharge from the passageway 7 through the valve seat 6, and this chamber 30 will serve efficiently to prevent all sputtering at the nipple outlet as the force of the steam or water is broken by passage into the chamber 30 and thence in backward course into the spherical body of the body portion 8 of the cock and through the outlet of the nipple 10.

The inner end of the valve 21 is formed with an exterior collar or shoulder 31 and preferably the body portion of the cock is formed with an annular chamber 32 to receive this shoulder 31, the shoulder 33 on the interior of the body portion of the cock serving to limit the outward movement of the valve when the shoulder or collar 31 contacts with the shoulder 33.

By reference to Fig. 1 of the drawing, it will be seen that there is a clearance space 35 (preferably about 1/64th of an inch) between the nut 23 and the outer end portion 14 of the bonnet 13. The purpose of this is to enable the handle 15 to be turned slightly (about one-half a revolution) before it engages the inner face of the nut 23. By this arrangement the loosening of the bonnet 13 by turning the hand wheel 15 releases the pressure holding the valve 21 onto the seat 6 without turning the valve upon its seat. If, however, the valve sticks to the seat, the engagement of the outer portion 14 of the bonnet with the nut 23 will promptly pull the valve 21 away from the seat 6. This is a very advantageous feature, as it effectively avoids the cutting of the valve seat.

By forming the chambered valve 21 with a lining of Babbitt metal or similar material, this lining can be readily renewed without destroying the valve stem, thus materially prolonging the life of the gage cock.

Inasmuch as the valve 21 is provided at its inner end with a collar 31, it will be impossible to remove the valve stem or valve without separating the main body of the gage cock from the plug or nipple which screws into the boiler. Hence, should an engineer remove the bonnet 13 for the purpose of oiling the parts, still all danger of the valve stem blowing out is effectively guarded against. In fact, there is no way in which the valve may be removed, except by first separating the main body of the gage cock from the plug or nipple that screws into the boiler. It will be observed that the conoidal valve seat 6 is made of such ample length that it can be readily ground or reamed off as wear occurs and without the necessity of renewing the plug or nipple of which it forms a part. Inasmuch as the body of the valve 21 is cylindrical and of large diameter and snugly fits within the cylindrical outer portion of the body of the gage cock, a comparatively tight joint is formed against the escape of steam or water, and any such escape is effectively prevented by the packing ring 26. In effect, the valve acts as a piston within the cylindrical outer portion of the body of the cock and the necessity for any further packing around the valve is avoided.

The valve stem and the body of the valve can be made of steel, iron or other suitable metal and inasmuch as the lining of Babbitt or other suitable metal is held within the chamber of the valve, all danger of the lining being squeezed out by seating or unseating the valve is avoided, since the more pressure that is put on the lining, the tighter it will be held within the shell of the valve. Moreover, as the valve stem 20 is securely incased and guided, all danger of this stem being broken or distorted is effectively guarded against.

A most important feature of my improved gage cock is that in case the valve should leak, it can be ground without blowing the pressure off the boiler. This can be accomplished by first removing the nut 23 from the end of the valve stem, then drawing the bonnet 13 back just enough to slacken or loosen the valve from the seat, after which a screw driver or like implement can be inserted in the notch 24 at the outer end of the valve stem and the valve can be rotated on its seat to effectively grind it. In practice, there will be found that there is enough grit or foreign matter in the water to grind the valve seat without the use of emery where a lining of Babbitt metal, copper, lead or like soft metal is used, and if there be any particles of scale under the seat, they can also be worked out in this manner.

My invention will be found to possess many advantageous features of novelty that will readily appeal to those familiar with this class of devices.

I wish it distinctly understood that while I have described what I regard as the preferred form of my invention, the precise details above set out may be varied without departing from the spirit of the invention and features of the invention may be employed without its adoption as an entirety.

Having thus described my invention what I claim as new and desire to secure by Letters Patent, is:—

1. A gage cock comprising a plug having a passageway therethrough and having an elongated outer portion provided with a valve seat at its end, a chambered body portion engaging said plug and provided with a discharge opening, a valve for engaging said valve seat, said valve having an unobstructed chamber opposite the passageway of the plug, and extending outwardly from the seat engaging surface of the valve, and means for operating said valve.

2. A gage cock comprising a plug having a passageway therethrough and having its outer portion provided with a valve seat at its end, a chambered body portion engaging said plug and provided with a discharge opening, a valve for engaging said valve seat, said valve having an unobstructed, elongated chamber extending outwardly from the seat engaging surface of the valve and opposite the passageway of the plug, the inner end of said valve chamber being shaped to fit over the valve seat and means for operating said valve.

3. A gage cock comprising a plug having a passageway therethrough and having its outer portion provided with a valve seat at its outer end, a chambered body portion engaging said plug, a valve for engaging said valve seat and having an unobstructed, elongated chamber extending outwardly from the seat engaging surface of the valve opposite the end of the passageway of the plug, and a cylindrical lining arranged within the chamber of the valve, said lining having its inner end beveled to engage the correspondingly beveled exterior surface of the valve seat and means for operating said valve.

4. A gage cock comprising a plug having a passageway therethrough and an outer portion provided with a conoidal valve seat at its end, a chambered body portion engaging said plug and provided with a discharge opening, a chambered valve having a lining formed with an unobstructed chamber extending outwardly opposite the passageway of the plug, said chamber having its inner end shaped to engage said conoidal valve seat and means for operating said valve.

5. A gage cock comprising a plug having a passageway therethrough and having a valve seat at its outer end, a chambered body portion engaging said plug and provided with a discharge opening, said chambered body portion being provided with a cylindrical interior surface adjacent its outer end, a valve having a cylindrical exterior surface fitting the correspondingly cylindrical portion of said chambered body whereby an initial straight line movement of the valve is permitted, a bonnet in threaded engagement with said body portion, said valve having a stem passing through said bonnet and means at the outer end of said valve stem for engagement with said bonnet after an initial movement of said bonnet has occurred.

6. A gage cock comprising a plug having a passageway therethrough and having its outer portion provided with a valve seat, a chambered body portion engaging said plug and provided with a discharge opening, a valve for engaging said valve seat and having an outwardly projecting valve stem, a screw threaded bonnet through which said valve stem passes, said bonnet being in threaded engagement with said chambered body portion, means whereby said bonnet may be turned and means at the outer end of said valve stem for engagement with said bonnet.

7. A gage cock comprising a plug having a passageway therethrough and having its outer portion provided with a valve seat, a chambered body portion engaging said plug and provided with a discharge opening, a valve adapted to engage said valve seat and having a cylindrical body fitting within the corresponding cylindrical portion of said chambered body, a stem for said valve, a bonnet in screw threaded engagement with said body portion and having an opening through which said valve stem passes and a hand wheel whereby said bonnet may be turned, said valve stem being provided at its outer end with means for engagement with said bonnet.

8. A gage cock comprising a plug having a passageway therethrough and having a valve seat at its outer end, a chambered body portion engaging said plug and provided with a discharge opening, a valve engaging said valve seat and having an outwardly projecting stem, a packing ring encircling said valve stem and arranged within the cylindrical part of said body portion and a screw threaded bonnet through which said valve stem passes, said bonnet being provided with means whereby it may be turned and said valve stem being provided with means for engagement with said bonnet.

9. A gage cock comprising a plug having a passageway therethrough and having a valve seat at its outer end, a chambered body portion engaging said plug and provided with a discharge opening, a valve engaging said valve seat and having an outwardly projecting stem, a sleeve encircling said valve stem, a packing ring also encircling said valve stem between said sleeve and the valve, (said packing ring and sleeve being arranged within the cylindrical part of said body portion) and a screw threaded bonnet through which said valve stem passes, said bonnet being provided with means whereby it may be turned and said valve stem being provided with means for engagement with said bonnet.

10. A gage cock comprising a plug having a passageway therethrough and having a valve seat, a chambered body portion engaging said plug and provided with a discharge opening, a valve engaging said valve seat and having a projecting stem provided at its outer end with a threaded portion, a screw threaded bonnet through which said valve passes, a nut engaging the threaded outer end of the valve stem adjacent said bonnet and means whereby said bonnet may be turned to shift said valve.

11. A gage cock comprising a plug having a passageway therethrough and having a valve seat, a chambered body portion engaging said plug and provided with a discharge opening, a valve engaging said valve seat and having a projecting stem provided at its outer end with a threaded portion, and with means whereby the valve may be turned to grind the same, a screw threaded bonnet through which said valve passes, a nut engaging the threaded outer end of the valve stem adjacent said bonnet and means whereby said bonnet may be turned to shift said valve.

12. A gage cock comprising a plug having a passageway therethrough and having a valve seat, a chambered body portion engaging said plug and provided with a discharge opening, said body portion having an interior, cylindrical surface, a valve engaging said valve seat and having an exterior cylindrical surface fitting within said cylindrical portion of the chambered body whereby an initial straight line movement of the valve may occur, said valve having an offset or shoulder projecting beyond said cylindrical surface of said body portion to prevent said valve passing in outward direction through said body portion and means for operating said valve.

13. A gage cock comprising a plug having a passageway therethrough and having a valve seat at its outer end, a chambered body portion engaging said plug and provided with a discharge opening, a valve engaging said valve seat and having at its inner end a shoulder adapted to contact with a shoulder on the interior of said body portion and so prevent the withdrawal of said valve in outward direction through said body portion, a stem for said valve, a screw threaded bonnet through which said stem passes, means whereby said bonnet may be turned and means whereby said valve stem may be shifted by said bonnet.

GEORGE J. HATZ.

Witnesses:
  CORNELIUS J. CAREY,
  JAMES T. BARRETT.